United States Patent
Ikeda et al.

(10) Patent No.: US 11,789,033 B2
(45) Date of Patent: *Oct. 17, 2023

(54) ROTATIONAL SPEED SENSOR AND PRODUCTION METHOD THEREFOR

(71) Applicant: Hitachi Metals, Ltd., Tokyo (JP)

(72) Inventors: Yukio Ikeda, Tokyo (JP); Yuta Kataoka, Tokyo (JP); Masanori Sagawa, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,421

(22) Filed: Mar. 18, 2022

(65) Prior Publication Data

US 2022/0206032 A1   Jun. 30, 2022

Related U.S. Application Data

(63) Continuation of application No. 16/794,867, filed on Feb. 19, 2020, now Pat. No. 11,313,874.

(30) Foreign Application Priority Data

Feb. 22, 2019   (JP) ................................ 2019-030132

(51) Int. Cl.
*G01P 3/44* (2006.01)
*B23K 26/21* (2014.01)

(52) U.S. Cl.
CPC ................ *G01P 3/44* (2013.01); *B23K 26/21* (2015.10)

(58) Field of Classification Search
CPC . G01P 3/44; G01P 1/026; B23K 26/21; B29L 2031/3481; B29C 66/54
See application file for complete search history.

(56) References Cited

U.S. PATENT DOCUMENTS

| 6,127,819 A * | 10/2000 | Ouchi ..................... G01P 3/487 |
| | | 324/173 |
| 10,509,050 B2 | 12/2019 | Welsch et al. |
| 2003/0001566 A1 | 1/2003 | Tsuge et al. |

(Continued)

FOREIGN PATENT DOCUMENTS

| JP | 2009-042003 A | 2/2009 |
| JP | 2013-208383 A | 10/2013 |

(Continued)

OTHER PUBLICATIONS

Office Action issued in corresponding Japanese Patent Application No. 2021-168617 dated Nov. 29, 2022; 3 pages.

*Primary Examiner* — Manuel A Rivera Vargas
(74) *Attorney, Agent, or Firm* — Thomas W. Cole; Calderon Safran & Cole P.C.

(57) ABSTRACT

A rotation speed sensor, configured to detect a rotation speed of a rotating body, is composed of a cable composed of an electric wire including a conductor wire, and a sheath provided over the electric wire, a circuit substrate mounted with an integrated circuit thereon and connected to the conductor wire being exposed from the cable, and a housing including a first housing, which is configured to hold the circuit substrate therein, and a second housing, which is configured to hold the cable therein, with the first housing being welded to the second housing, and with the second housing being welded to a surface of the sheath of the cable.

6 Claims, 9 Drawing Sheets

(56) References Cited

U.S. PATENT DOCUMENTS

| | | |
|---|---|---|
| 2009/0039880 A1 | 2/2009 | Nomura et al. |
| 2012/0112742 A1 | 5/2012 | Schrader |
| 2016/0142635 A1 | 5/2016 | Kaneko et al. |
| 2018/0024156 A1 | 1/2018 | Welsch et al. |

FOREIGN PATENT DOCUMENTS

| | | |
|---|---|---|
| JP | 2014-132238 A | 7/2014 |
| JP | 2018-505417 A | 2/2018 |

\* cited by examiner

ROTATIONAL SPEED SENSOR AND
PRODUCTION METHOD THEREFOR

CROSS-REFERENCE TO RELATED APPLICATIONS

The present invention is based on Japanese Patent Application No. 2019-030132 filed on Feb. 22, 2019, the entire contents of which are incorporated herein by reference.

BACKGROUND OF THE INVENTION

1. Field of the Invention

The present invention relates to a rotational speed sensor and a method for producing the same.

2. Description of the Related Art

Conventionally, automobiles are equipped with various sensors. As such an in-vehicle sensor, for example, there is known a connector type sensor, which is configured in such a manner that a terminal, which is coupled to an element for the sensor is drawn out of a resin material member (see JP-A-2009-42003 and JP-A-2018-505417).

An electric current sensor disclosed in JP-A-2009-42003 is composed of a resin case equipped with a built-in magnetic field concentrating core of a ring shape having a gap, which is insert molded in the resin case in such a manner that the gap of the magnetic field concentrating core is exposed into an internal space of the resin case leading to one opening portion of the resin case, and an element holder, which is mounted with a magnetoelectric transduction element thereon, with a terminal pin, which is coupled to the magnetoelectric transduction element, being insert molded in the element holder in such a manner as to be exposed from one end face of a resin holder, with the magnetoelectric transduction element of the element holder being arranged within the gap of the magnetic field concentrating core of the resin case, with the element holder being inserted in through the one opening portion of the resin case and fixed to the resin case equipped with the built-in magnetic field concentrating core.

A wheel sensor device disclosed in JP-A-2018-505417 is configured to include a sensor housing and a rotation number sensor disposed within that sensor housing, with the sensor housing including a 3 pole, or 4 pole, or 2×2 pole plug component, with the rotation number sensor being connected to the plug component with a bus bar, which is extending from the rotation number sensor to the plug component.

[Patent Document 1] JP-A-2009-42003
[Patent Document 2] JP-A-2018-505417

SUMMARY OF THE INVENTION

Now, a rotation speed sensor configured to detect a rotation speed of a wheel of an automobile or the like may be disposed in a place where a certain waterproofing performance (or also referred to as "hermetic sealing performance") is required, such as a place around a tire (under a spring) or the like.

However, since, in the electric current sensor disclosed in JP-A-2009-42003, the terminal pin is exposed from the one end face of the resin holder, there is concern that a liquid such as water or the like may intrude into the resin case equipped with the built-in magnetic field concentrating core from between the terminal pin and the resin holder. Similarly, since, also in the wheel sensor device disclosed in JP-A-2018-505417, the bus bar and the sensor housing are not being joined together, there is concern that a liquid such as water or the like may intrude into the sensor housing from between the bus bar and the sensor housing.

In this regard, it is conceivable to use a method of obtaining the waterproofing performance of the electric current sensor disclosed in JP-A-2009-42003 or the wheel sensor device disclosed in JP-A-2018-505417 by coating a substrate or an integrated circuit (IC) mounted on the substrate with a resin mold. According to this method, however, there is concern that a load is applied to the substrate or the IC due to pressure or heat during molding.

Accordingly, it is one object of the present invention to provide a rotation speed sensor, which is capable of being made high in waterproofing performance with no load due to pressure or heat being applied to a substrate or an IC, and it is another object of the present invention to provide a method for producing the same rotation speed sensor.

For the purpose of solving the above problems, the present invention provides a rotation speed sensor, configured to detect a rotation speed of a rotating body, comprising: a cable composed of an electric wire including a conductor wire, and a sheath provided over the electric wire; a circuit substrate mounted with an integrated circuit thereon and connected to the conductor wire being exposed from the cable; and a housing including a first housing, which is configured to hold the circuit substrate therein, and a second housing, which is configured to hold the cable therein, with the first housing being welded to the second housing, and with the second housing being welded to a surface of the sheath of the cable.

Further, for the purpose of solving the above problems, the present invention provides a method for producing a rotation speed sensor configured to detect a rotation speed of a rotating body, comprising: molding a first housing to hold a circuit substrate mounted with an integrated circuit thereon; molding a second housing to hold a cable composed of an electric wire including a conductor wire, and a sheath provided over the electric wire, with the second housing being welded to a surface of the sheath of the cable; soldering the circuit substrate to the conductor wire being exposed from the cable; holding the circuit substrate in the first housing; and welding the first housing and the second housing together with a specific wavelength of laser light.

Points of the Invention

The rotation speed sensor according to the present invention is capable of being made high in waterproofing performance with no load due to pressure or heat being applied to a substrate or an IC.

DETAILED DESCRIPTION OF THE PREFERRED EMBODIMENTS

Embodiment

Figure 1:
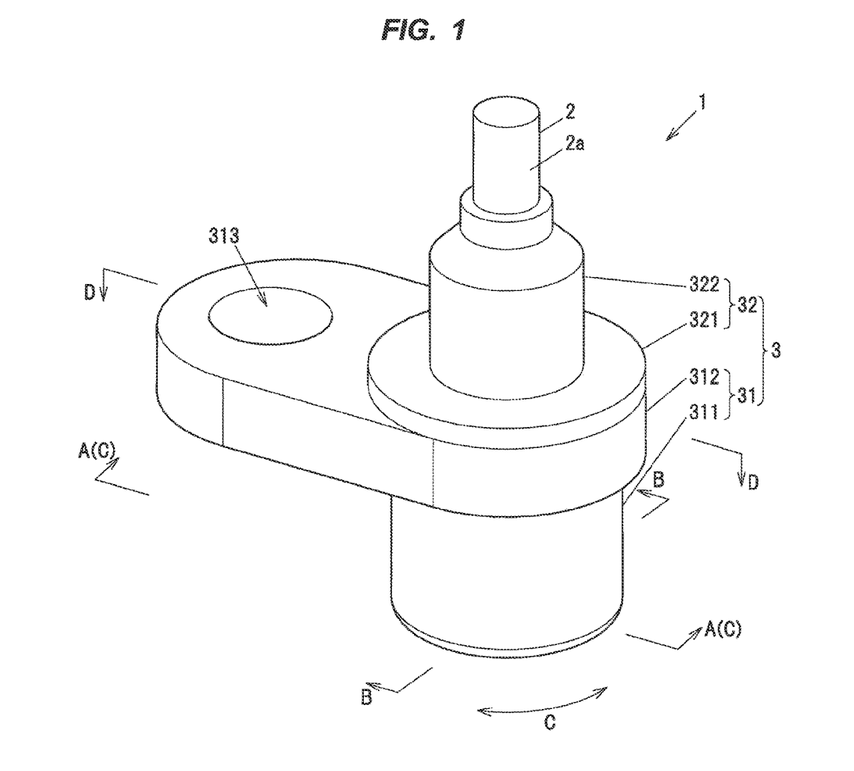
FIG. 1 is a perspective view showing a rotation speed sensor according to an embodiment of the present invention.

FIG. 1 is a perspective view showing a rotation speed sensor 1 according to an embodiment of the present invention. As shown in FIG. 1, the rotational speed sensor 1 according to the embodiment of the present invention is configured to include a cable 2, which is configured to include one pair of electric wires 20 and 20 (see FIG. 2) and a sheath 2a that is provided over an outer periphery of the one pair of electric wires 20 and 20, a circuit substrate 4 (see FIG. 7) to which the one pair of electric wires 20 and 20 are electrically connected, an integrated circuit 5 (see FIG. 7), which is mounted on the circuit substrate 4, and a housing 3, which is configured to include a circuit substrate side housing 31, which is configured to hold the circuit substrate 4 mounted with the integrated circuit 5 (herein, also referred to as simply "IC 5") thereon, and a cable side housing 32, which is configured to hold the cable 2.

The rotation speed sensor 1 is a sensor configured to detect a rotation speed of a rotating body mounted in an automobile, such as an ABS sensor configured to be used in an ABS (anti-lock brake system) to detect a rotation speed of a wheel of an automobile, for example. Further, the rotation speed sensor 1 may be a rotation speed sensor configured to detect a rotation speed of another rotating body mounted in the automobile, such as a compressor wheel for a turbocharger.

The circuit substrate side housing 31 is one example of a "first housing" in the appended claims. The cable side housing 32 is one example of a "second housing" in the appended claims. The IC 5 is configured to constitute a detecting portion, which is internally equipped with a detecting element and a signal processing circuit. Note that the circuit substrate 4 and the IC 5 are not shown in FIG. 1 because they are located inside of the housing 3.

The cable 2 is welded to an inner interface of the cable side housing 32 by insert molding, which will be described later. The one pair of electric wires 20 and 20 are electrically connected to the circuit substrate 4 by soldering. The circuit substrate side housing 31 and the cable side housing 32 are welded together by laser welding, which will be described later. Hereinafter, each constituent element of the rotation speed sensor 1 will be described.

Note that, in the following description, a distal end of the rotation speed sensor 1, that is, one end thereof located in a circuit substrate 4 side (in the lower side of FIG. 1) in which a measurement target object is located with the rotation speed sensor 1 being mounted in the vehicle, is also referred to as a "front end", while a proximal end of the rotational speed sensor 1, that is, the other end thereof located in a control device (not shown) side (in the upper side of FIG. 1) with the rotation speed sensor 1 being mounted in the vehicle, is also referred to as a "base end".

(Cable 2)

Figure 2:
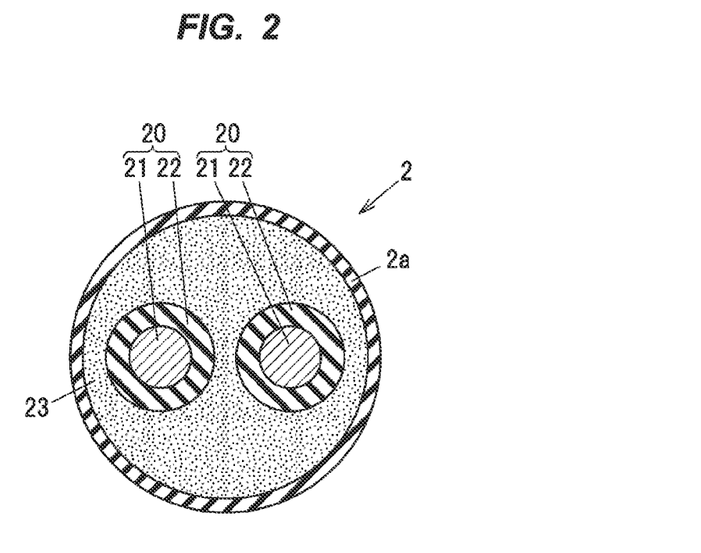
FIG. 2 is a transverse cross-sectional view showing a cable.

Next, the cable 2 will be described with reference to FIG. 2. FIG. 2 is a transverse cross-sectional view showing the cable 2. Note that FIG. 2 is the cross-sectional view of the cable 2 viewed from a direction indicated by an arrow A in FIG. 5, which will be described later. As shown in FIG. 2, the cable 2 is configured to include the one pair (two) of twisted electric wires 20 and 20, the sheath 2a, and a filling member 23.

The one pair of electric wires 20 and 20 are each being configured to include, for example, a respective conductor wire 21, which is composed of a plurality of wires made of a copper laid together, and a respective electrical insulating member 22, which is made of a polyethylene and which is provided over the respective conductor wire 21. The sheath 2a is of a cylindrical shape, and is provided over the one pair of electric wires 20 and 20 together. The sheath 2a is formed of, e.g., a urethane-based resin such as a thermoplastic polyurethane or the like. In the interior of the sheath 2a, the fibrous filling member 23 is arranged between an inner surface of the sheath 2a and the one pair of electric wires 20 and 20.

(Housing 3)

(1) Circuit Substrate Side Housing 31

Figure 3:
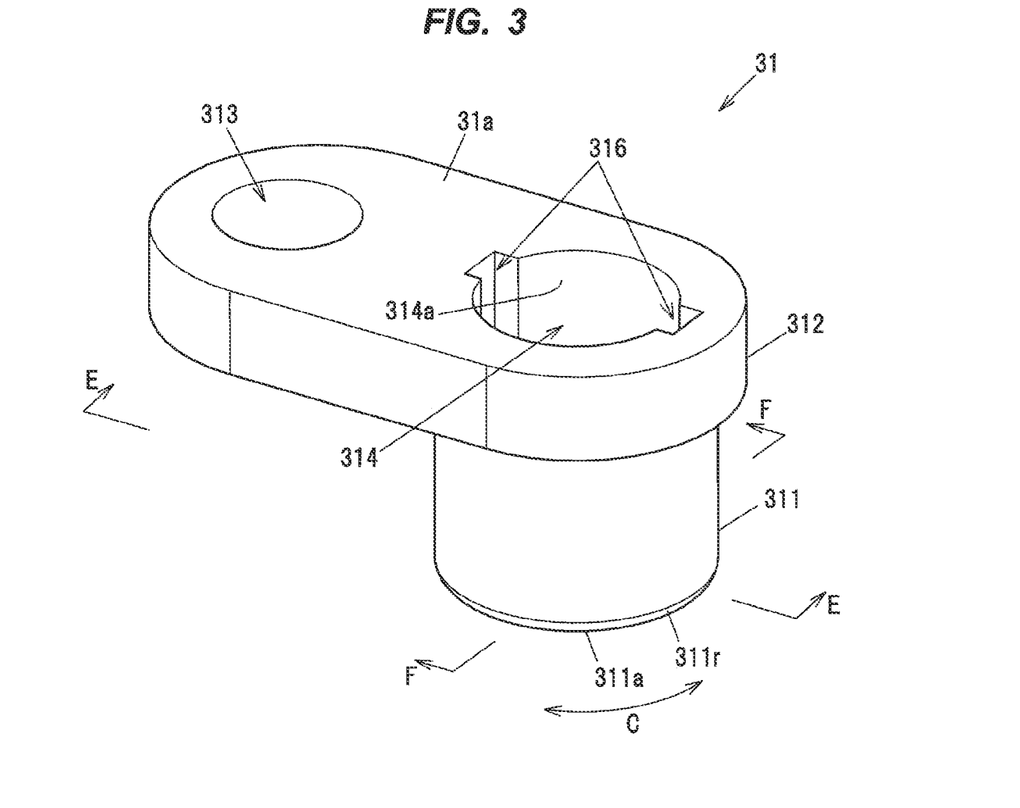
FIG. 3 is a perspective view showing a circuit substrate side housing.
Figure 4A:
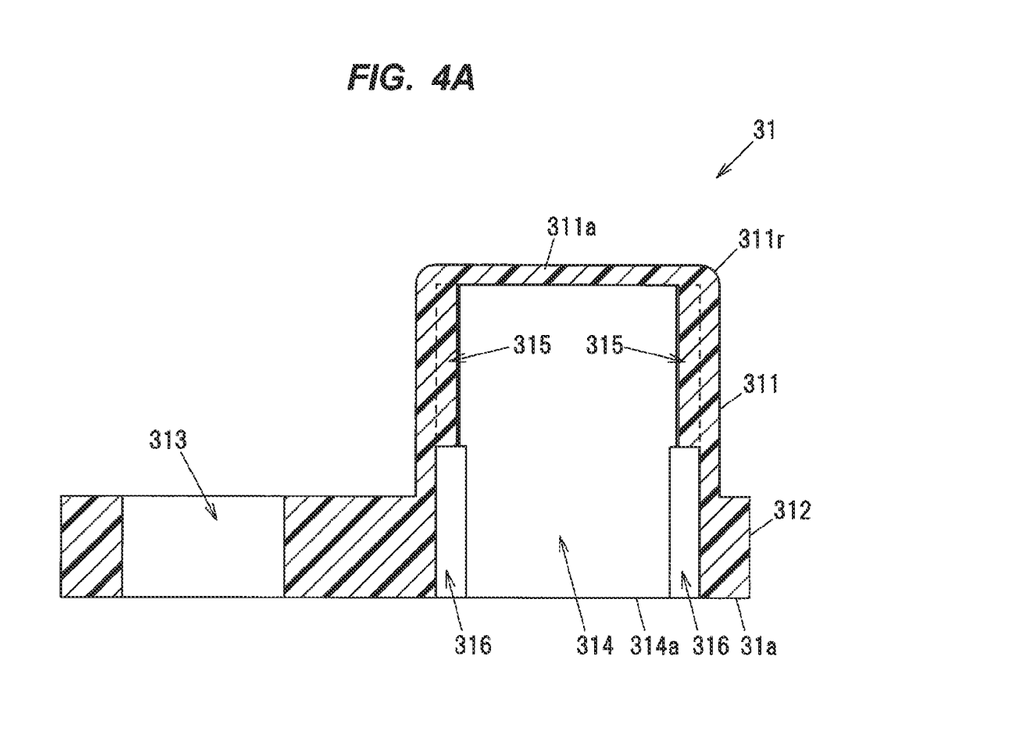
FIG. 4A is a sectional view taken along line E-E of FIG. 3 showing the circuit substrate side housing.
Figure 4B:
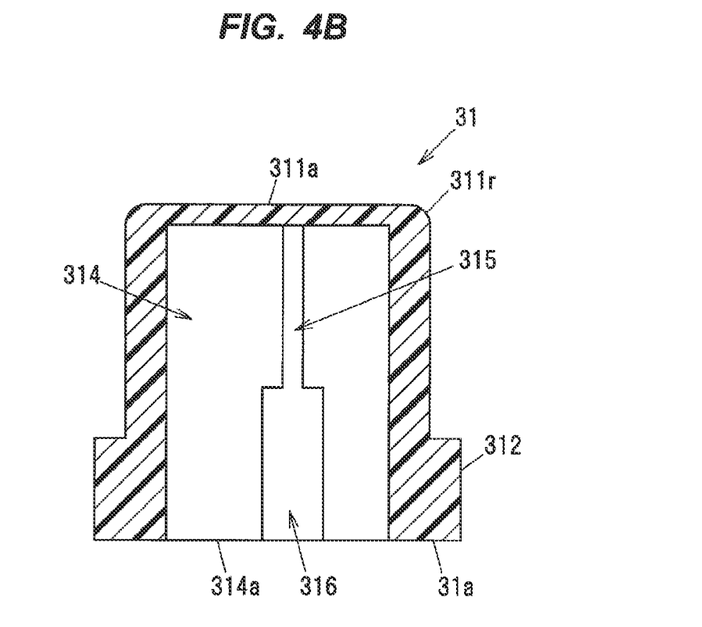
FIG. 4B is a cross-sectional view taken along line F-F of FIG. 3 showing the circuit substrate side housing.

FIG. 3 is a perspective view showing the circuit substrate side housing 31. FIG. 4A is a cross-sectional view taken along the line E-E in FIG. 3, and FIG. 4B is a cross-sectional view taken along the line F-F in FIG. 3. The circuit substrate side housing 31 is configured to integrally include an IC holding portion 311, which is of a cylindrical shape with a bottom, and a flanged portion 312, which is of an outer elongated circular plate shape, and which is connected to a base end side of the IC holding portion 311.

The interior of the circuit substrate side housing 31 is formed with a substantially circular columnar holding space 314 therein, which is extending in an extending direction of a central axis of the circuit substrate side housing 31 from a base end of the flanged portion 312 to hold the circuit substrate 4 including the IC 5 and a part of a front end side of the one pair of electric wires 20 and 20. In addition, in the circuit substrate side housing 31, an IC holding portion 311 side inner peripheral surface of an inner peripheral surface 314a forming the holding space 314 is formed with one pair of rectangular first grooved portions 315 and 315 thereon, which are extending from a front end side toward a base end side in the IC holding portion 311. The one pair of first grooved portions 315 and 315 are formed to hold both end portions 4a and 4a in left and right directions, respectively, of the circuit substrate 4 therein.

In addition, in the circuit substrate side housing 31, the inner peripheral surface 314a forming the holding space 314 is further being formed with one pair of rectangular second grooved portions 316 and 316 thereon, which are extending from the base end face of the flanged portion 312 up to the IC holding portion 311 in which the one pair of second grooved portions 316 and 316 are continuous with the one pair of first grooved portions 315 and 315, respectively. The one pair of second grooved portions 316 and 316 are formed in positions where their central axes are common to the central axes of the one pair of first grooved portions 315 and 315, respectively, in circumferential directions indicated by double arrows C (herein referred to as the circumferential directions C) of the IC holding portion 311 in FIG. 3. Further, the widths of the one pair of second grooved portions 316 and 316 in the circumferential directions C of the IC holding portion 311 are larger than the widths of the one pair of first grooved portions 315 and 315 in the circumferential directions C of the IC holding portion 311. The one pair of second grooved portions 316 and 316 are formed to hold two supporting portions 326 and 326 of the cable side housing 32 therein, which will be described later (see FIGS. 8A and 8B).

Note that the one pair of first grooved portions 315 and 315 and the one pair of second grooved portions 316 and 316 may not necessarily be located on the central line of the circle in the transverse cross section (the straight line passing through the center of the circle constituting the transverse cross section) of the holding space 314 in the circuit substrate side housing 31. The one pair of first grooved portions 315 and 315 and the one pair of second grooved portions 316 and 316 may, for example as shown in FIG. 4B, be provided in positions slightly shifted in a width direction of the flanged portion 312 from the central line of the cross section of the holding space 314 in the circuit substrate side housing 31. By providing the one pair of first grooved portions 315 and 315 and the one pair of second grooved portions 316 and 316 in the above described manner, it is possible to prevent the occurrence of an incorrect attachment of the circuit substrate side housing 31 when the circuit substrate side housing 31 has a particular direction of attachment.

In the circuit substrate side housing 31, a front end face 311a of the IC holding portion 311 is of a flat shape. Further, a rimmed portion 311r of the front end face 311a is of a rounded (rounded corner) shape. The flanged portion 312 of the circuit substrate side housing 31 is formed with a through hole 313, which is passing through the flanged portion 312 in a direction of a plate thickness of the flanged portion 312, in a region of the flanged portion 312 at an exterior side of the IC holding portion 311 in a radial direction of the IC holding portion 311. When the rotational speed sensor 1 is mounted in the vehicle, the rotational speed sensor 1 is fixed to the vehicle body by a fixing tool such as a bolt or a rivet (not shown) or the like being inserted in and passed through the above through hole 313.

The circuit substrate side housing 31 is formed by molding a resin material. The circuit substrate side housing 31 is formed preferably of a nylon resin. Further, an outer surface 31a of the circuit substrate side housing 31 (at least the base end face of the flanged portion 312 of the circuit substrate side housing 31) is dyed with a predetermined color (e.g., a black color) that allows a wavelength range of laser light to be absorbed by the circuit substrate side housing 31 easily, which will be described later. Specifically, the nylon resin to form the circuit substrate side housing 31 is pre-impregnated with a predetermined dye. That is, the circuit substrate side housing 31 acts as an absorption side housing to absorb the wavelength range of the laser light.

(2) Cable Side Housing 32

Figure 5:
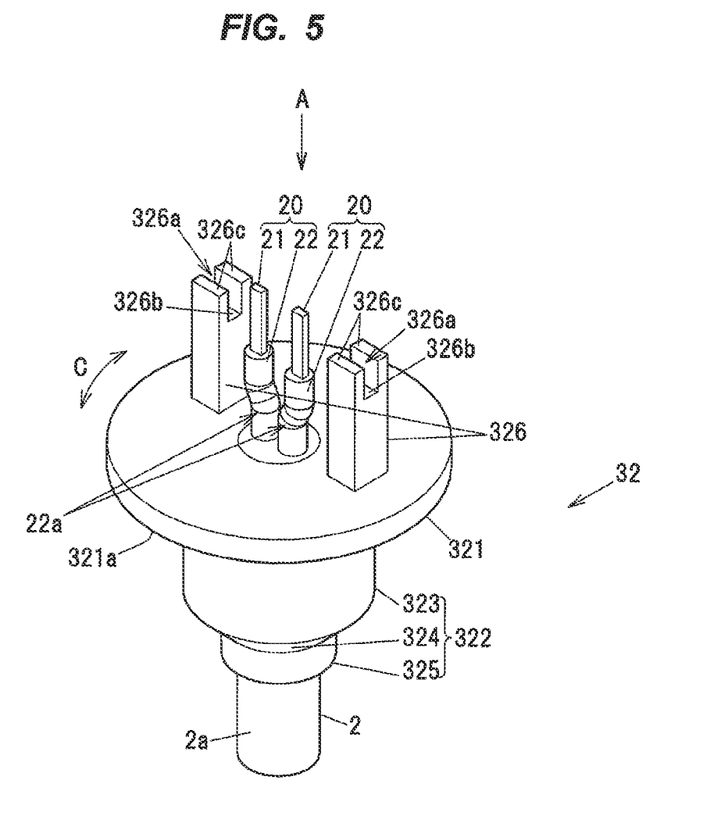
FIG. 5 is a perspective view showing a cable side housing with the cable being held therein.
Figure 6:
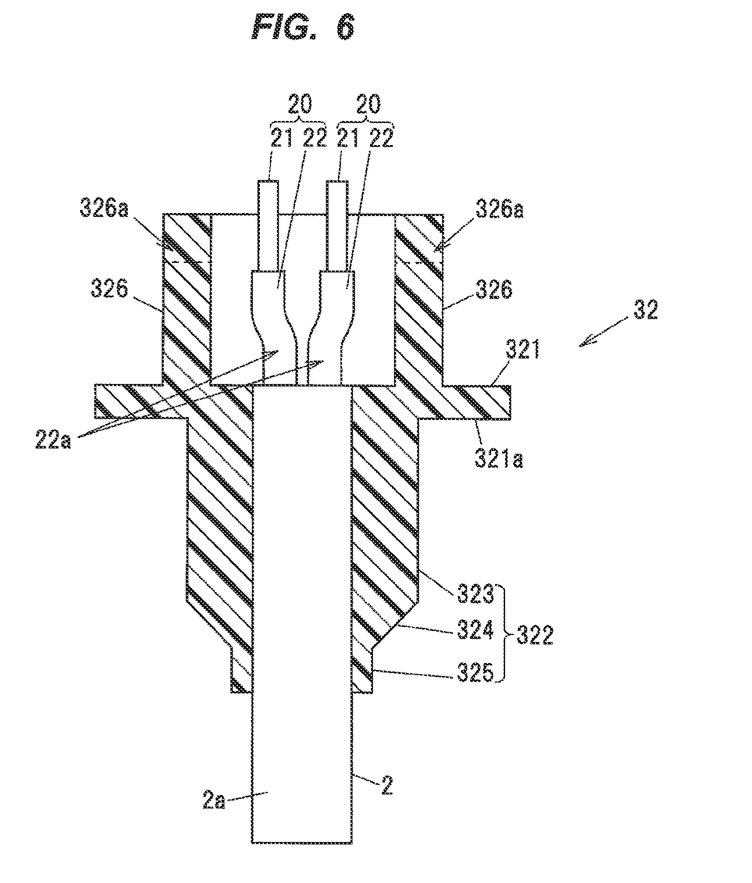
FIG. 6 is a longitudinal cross-sectional view showing the cable side housing shown in FIG. 5.

FIG. 5 is a perspective view showing the cable side housing 32 with the cable 2 being held therein. FIG. 6 is a longitudinal cross-sectional view showing the cable side housing 32 shown in FIG. 5. The cable side housing 32 is configured to integrally include a circular plate shape collared portion 321, a cable holding portion 322, which is connected to one surface (one surface at the base end side) of the collared portion 321, and which has a diameter smaller than a diameter of the collared portion 321, to hold the cable 2, and two supporting portions 326 and 326, which are extending in the front end direction from the other surface (the surface at the front end side) of the collared portion 321, to support the circuit substrate 4.

The cable holding portion 322 of the cable side housing 32 is configured to integrally include a small diameter cylindrical portion 325, which is located at the base end side used as an inlet side for pouring a resin material, a large diameter cylindrical portion 323, which is configured to trap heat during molding of the cable holding portion 322, and an intermediate cylindrical portion 324, which is of a tapered outer shape, and which is located between the small diameter cylindrical portion 325 and the large diameter cylindrical portion 323, to connect the small diameter cylindrical portion 325 and the large diameter cylindrical portion 323 with the intermediate cylindrical portion 324 therebetween suppressing an abrupt change in shape from the small diameter cylindrical portion 325 to the large diameter cylindrical portion 323.

Further, in the cable side housing 32, the interior of the collared portion 321 and the interior of the cable holding portion 322 are formed with a hollow portion, which is passing through the cable holding portion 322 along an extending direction of a central axis of the cable holding portion 322, i.e., passing through the small diameter cylindrical portion 325 from a base end face of the small diameter cylindrical portion 325, and passing through the intermediate cylindrical portion 324 and the large diameter cylindrical portion 323 in turn, and passing through the collared portion 321 up to a front end face of the collared portion 321. The inner diameter of the hollow portion of the cable side housing 32 is uniform over the entire hollow portion extending from the small diameter cylindrical portion 325 to the collared portion 321. The cable 2 is held in the above hollow portion of the cable side housing 32.

In the cable side housing 32, the two supporting portions 326 and 326 are the constituent members, which are of a columnar shape and which are provided on the front end face of the collared portion 321. Front end portions of the two supporting portions 326 and 326 are formed with holding portions 326b and 326b, respectively, to hold the circuit substrate 4. In the two supporting portions 326 and 326, their respective holding portions 326b and 326b are constituted, for example by respective grooves 326a and 326a, respectively, which are passing through the supporting portions 326 and 326 in radial directions, respectively, of the collared portion 321, and which have a predetermined depth along central axes of the supporting portions 326 and 326 from front end faces of the supporting portions 326 and 326 toward base end sides of the supporting portions 326 and 326, respectively, and respective two flat plate shape portions 326c and 326c, and 326c and 326c, respectively, which are formed opposite each other in circumferential directions indicated by double arrows C (herein referred to as the circumferential directions C) of the collared portion 321 with the respective grooves 326a and 326a being interposed between those respective two flat plate shape portions 326c and 326c, and 326c and 326c, respectively. The widths of the respective grooves 326a and 326a in the circumferential directions C of the collared portion 321 may be appropriately adjusted according to the thickness of the circuit substrate 4 so that the flat plate shape portions 326c and 326c, and 326c and 326c are engaged with the circuit substrate 4.

Further, in the cable side housing 32, the two supporting portions 326 and 326 may not necessarily be located on a straight line passing through the center of the upper surface of the collared portion 321, as with the one pair of first grooved portions 315 and 315 and the one pair of second grooved portions 316 and 316 in the circuit substrate side housing 31 described above, but the two supporting portions 326 and 326 may, for example as shown in FIG. 5, be provided in positions slightly shifted in any direction relative to the central line of the upper surface of the collared portion 321 in the cable side housing 32. By providing the two supporting portions 326 and 326 in the above described manner, it is possible to prevent the occurrence of an incorrect attachment of the cable side housing 32 when the cable side housing 32 has a particular direction of attachment.

The cable side housing 32, as with the circuit substrate side housing 31, is formed by molding a resin material. The cable side housing 32 is formed preferably of a resin material, which is the same in type as the resin material used in forming the circuit substrate side housing 31. That is, the cable side housing 32 is formed preferably of a nylon resin. This is because if the cable side housing 32 is formed of a material different from the material for the circuit substrate side housing 31, a difference arises in the degrees of expansion and contraction due to a difference in expansion coefficient between those two materials, therefore leading to concern that there may be an increase in the load caused by the difference in the expansion and contraction between the cable side housing 32 and the circuit substrate side housing 31 when the cable side housing 32 and the circuit substrate side housing 31 are welded together.

Further, the cable side housing 32 is made preferably with a translucent member formed of the above described resin material. This is intended to allow laser light to be transmitted through the cable side housing 32 easily. That is, the cable side housing 32 acts as a transmission side housing to transmit the laser light. For that reason, preferably the deliberately undyed translucent member is used in the cable side housing 32. As one example, when the cable side housing 32 is formed of the nylon resin, the color of the cable side housing 32 is a translucent white color, which is a natural color of the nylon resin.

The cable side housing 32 is molded by insert molding while being welded to a surface of the cable 2. Specifically, the cable side housing 32 is formed into the above-described shape by insert molding while melting an inner peripheral surface of the above-described hollow portion of the cable side housing 32 with heat during the insert molding, and thereby welding the cable side housing 32 to an outer surface of the sheath 2a of the cable 2.

Note that the one pair of electric wires 20 and 20 being guided out from the cable side housing 32 in the front end direction of the cable side housing 32 may be bent within the circuit substrate side housing 31. In the present embodiment, the cable 2 is configured to include a branching portion 22a with the one pair of electric wires 20 and 20 branching therein by being bent in directions away from each other.

(Circuit Substrate 4)

Figure 7:
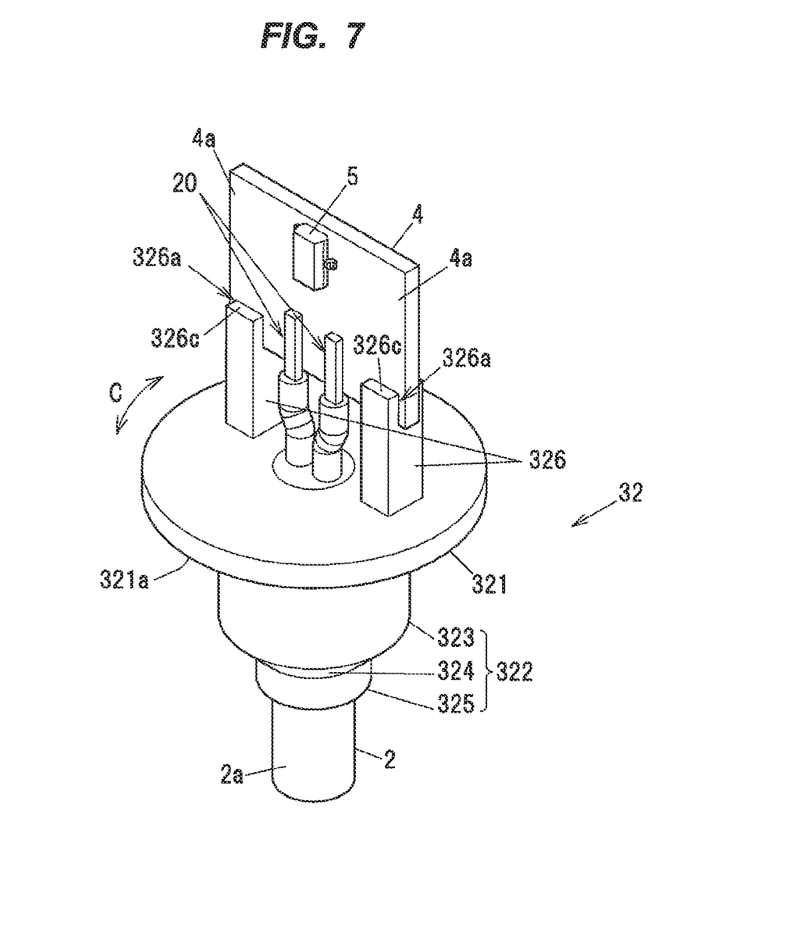
FIG. 7 is a diagram for describing the cable side housing with a circuit substrate being mounted thereto.

FIG. 7 is a diagram for describing the cable side housing 32 with the circuit substrate 4 being mounted thereto. As shown in FIG. 7, the circuit substrate 4 is mounted with the IC 5 thereon. Further, the circuit substrate 4 is configured to include electrodes (not shown), and the conductor wires 21 and 21 being exposed from the electrical insulating members 22 and 22 of the one pair of electric wires 20 and 20 are electrically connected by soldering to those electrodes, respectively, of the circuit substrate 4. Note that, in the example shown in FIG. 7, the conductor wires 21 and 21 of the one pair of electric wires 20 and 20 are depicted in a rectangular shape, but that the shapes of the conductor wires 21 and 21 of the one pair of electric wires 20 and 20 are not limited to the rectangular shape.

The circuit substrate 4 is held in the respective holding portions 326b and 326b being provided at the front end portions of the two supporting portions 326 and 326 in the cable side housing 32. Specifically, the circuit substrate 4 is held in the respective holding portions 326b and 326b of the two supporting portions 326 and 326 in the cable side housing 32 by allowing both the end portions 4a and 4a at the left and right sides of the circuit substrate 4 to be engaged with the respective grooves 326a and 326a, respectively, being formed at the front end portions of the two supporting portions 326 and 326, respectively, and be held between the respective two opposite flat plate shape portions 326c and 326c, and 326c and 326c of the two supporting portions 326 and 326, respectively, with the respective grooves 326a and 326a being interposed between those respective two opposite flat plate shape portions 326c and 326c, and 326c and 326c of the two supporting portions 326 and 326, respectively, in the cable side housing 32.

(IC 5)

The IC 5 is configured to include, for example, a magnetic detecting element such as a Hall element, a GMR (Giant Magneto Resistive effect) element, an AMR (Anisotropic Magneto Resistive) element, a TMR (Tunneling Magneto Resistive) element, or the like.

(Production Method for the Rotation Speed Sensor 1)

Next, a method for producing the rotational speed sensor 1 according to the present invention will be described. The method for producing the rotational speed sensor 1 according to the present invention is configured to mainly include the following five steps of:

(1) molding the circuit substrate side housing 31;
(2) molding the cable side housing 32;
(3) soldering the one pair of electric wires 20 and 20 to the circuit substrate 4;
(4) assembling the housing 3; and
(5) welding the circuit substrate side housing 31 and the cable side housing 32 together. Each step will be described below. Note that, as for the contents of the descriptions of the constituent elements described above, the duplicated descriptions thereof will be omitted. Further, the cable 2 shall be prepared in advance, and the IC 5 shall be mounted on the circuit substrate 4 in advance.

(1) Step of Molding the Circuit Substrate Side Housing 31

The circuit substrate side housing 31 having the above-described shape (see FIGS. 3, 4A and 4B) is formed by molding using the nylon resin.

(2) Step of Molding the Cable Side Housing 32

Next, the cable side housing 32 having the above-described shape (see FIGS. 5 and 6) and holding the cable 2 therein is formed by using the nylon resin while melting the inner resin interface of the cable side housing 32 with heat and thereby welding the cable side housing 32 to the outer surface of the sheath 2a of the cable 2.

(3) Step of Soldering the One Pair of Electric Wires 20 and 20 to the Circuit Substrate 4

Next, both the end portions 4a and 4a of the circuit substrate 4 are arranged in the respective grooves 326a and 326a, respectively, being formed at the front end portions of the two supporting portions 326 and 326, respectively, in the cable side housing 32, to thereby fix the circuit substrate 4 to the two supporting portions 326 and 326 in the cable side housing 32. Further, the one pair of electric wires 20 and 20 are electrically connected to the circuit substrate 4. Specifically, the electrical insulating members 22 and 22 are stripped from the one pair of electric wires 20 and 20 being guided out from the sheath 2a of the cable 2 to expose the conductor wires 21 and 21. Then, the exposed conductor wires 21 and 21 of the one pair of electric wires 20 and 20 are electrically connected by soldering to the electrodes, respectively, of the circuit substrate 4 (see FIG. 7).

(4) Step of Assembling the Housing 3

Figure 8A:
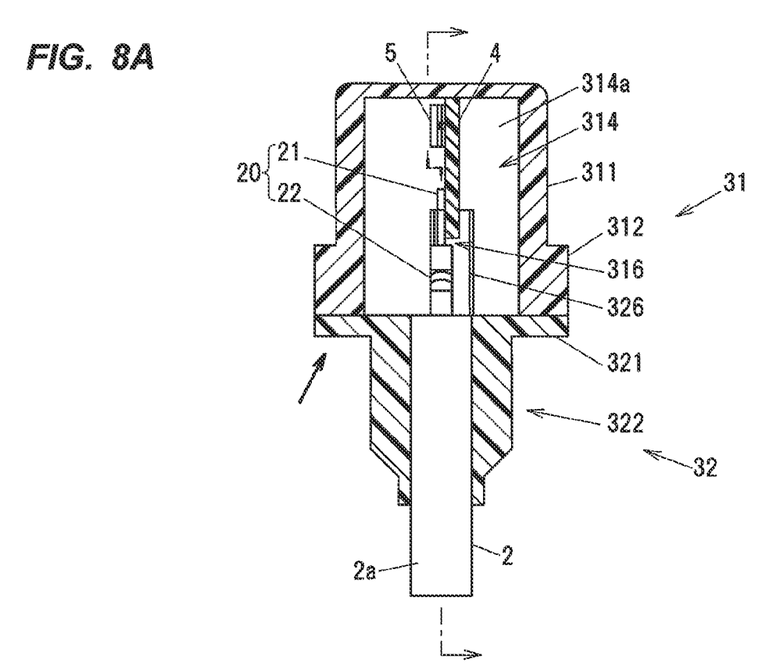
FIG. 8A is a cross-sectional view taken along line B-B of FIG. 1 showing the rotational speed sensor of FIG. 1.
Figure 8B:
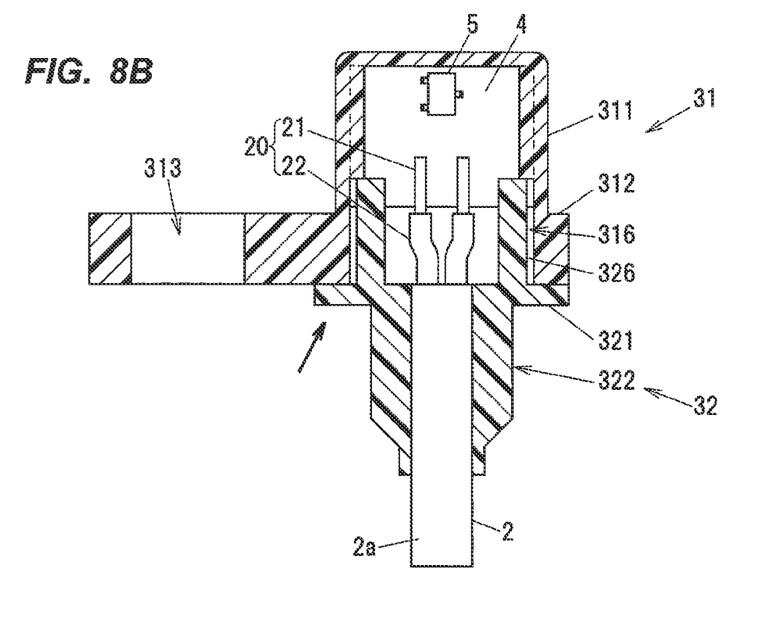
FIG. 8B is a cross-sectional view taken along line C-C of FIG. 1 showing the rotational speed sensor of FIG. 1.

Next, the housing 3 is assembled. FIG. 8A is a cross sectional view taken along line B-B of FIG. 1 showing the rotational speed sensor 1 of FIG. 1, and FIG. 8B is a cross sectional view taken along line C-C of FIG. 1 showing the rotational speed sensor 1 of FIG. 1. As shown in each figure of FIGS. 8A and 8B, the circuit substrate side housing 31 is put over the cable side housing 32 with the one pair of electric wires 20 and 20 soldered to the circuit substrate 4 being welded thereto. At this point of time, the circuit substrate side housing 31 is put over the cable side housing 32 in such a manner that the locations of the two supporting portions 326 and 326 of the cable side housing 32 in the circumferential directions C of the IC holding portion 311 of the circuit substrate side housing 31 are in correspondence with the locations of the one pair of second grooved portions 316 and 316, respectively, of the circuit substrate side housing 31.

The two supporting portions 326 and 326 of the cable side housing 32 are held in the one pair of second grooved portions 316 and 316, respectively, of the circuit substrate side housing 31. Further, the circuit substrate 4 is held in the circuit substrate side housing 31. Specifically, the circuit substrate 4 is held in the circuit substrate side housing 31 by allowing the portions at the outer edges of the circuit substrate 4 relative to both the end portions 4a and 4a of the circuit substrate 4 held between the respective one pairs of the flat plate shape portions 326c and 326c, and 326c and 326c of the two supporting portions 326 and 326, respectively, of the cable side housing 32, i.e., the portions of the circuit substrate 4 extending to the outer sides relative to the outermost portions of the two supporting portions 326 and 326 in the opposite radial directions of the collared portion 321 (the side surfaces at the outer sides of the two supporting portions 326 and 326 in the opposite radial directions of the collared portion 321 when the two supporting portions 326 and 326 are of a rectangular columnar shape as in the present embodiment) of the cable side housing 32 to be held in the one pair of first grooved portions 315 and 315, respectively, of the circuit substrate side housing 31.

Note that, as described above, by allowing the one pair of first grooved portions 315 and 315 and the one pair of second grooved portions 316 and 316 of the circuit substrate side housing 31 to be provided in the positions slightly shifted in the width direction of the flanged portion 312 from the central line of the cross section of the holding space 314 of the circuit substrate side housing 31, and the two supporting portions 326 and 326 of the cable side housing 32 to be provided in the positions slightly shifted in any direction relative to the central line of the upper surface of the collared portion 321 of the cable side housing 32, it is possible to prevent the occurrence of an incorrect attachment of the circuit substrate side housing 31 and the cable side housing 32 when the circuit substrate side housing 31 and the cable side housing 32 have a particular direction of attachment.

(5) Step of Laser Welding the Circuit Substrate Side Housing 31 and the Cable Side Housing 32 Together Next, in the assembled housing 3, the circuit substrate side housing 31 and the cable side housing 32 are welded together. Specifically, a part of the base end face of the flanged portion 312 of the circuit substrate side housing 31 and a part of the front end face of the collared portion 321 of the cable side housing 32 are welded together.

In the present embodiment, the circuit substrate side housing 31 and the cable side housing 32 are joined by laser welding. That is, at least one part of the region where the circuit substrate side housing 31 and the cable side housing 32 are in surface contact is irradiated with laser light having a specific wavelength, to melt the constituent nylon resin of the circuit substrate side housing 31 and the cable side housing 32 and thereby weld the circuit substrate side housing 31 and the cable side housing 32 together.

As one example, the base end face 321a of the collared portion 321 of the cable side housing 32 is irradiated with the laser light from the underside thereof along a closed loop surrounding an outer side relative to the large diameter cylindrical portion 323 (see an arrow in FIGS. 8A and 8B). Preferably, the base end face 321a of the collared portion 321 of the cable side housing 32 is irradiated with the laser light along a circle having a predetermined diameter and being coaxial with the cable side housing 32. Note that the above circle has the same center as the center of the collared portion 321 of the cable side housing 32 and is located at the outer sides relative to the two supporting portions 326 and 326 of the cable side housing 32 in a view of the upper surface of the collared portion 321 of the cable side housing 32 (or in a view of the lower surface of the flanged portion 312 of the circuit substrate side housing 31).

At this point of time, the laser light irradiation may be performed in such a manner that the direction of the light ray of the laser light is parallel to the axial direction of the cable side housing 32, that is, perpendicular to the base end face 321a of the collared portion 321 of the cable side housing 32, or the laser light irradiation may be performed in such a manner that the direction of the light ray of the laser light is oblique to the axial direction of the cable side housing 32. Further, in the present embodiment, the laser light irradiation part (not shown) is fixed while the housing 3 is moved to perform the circular laser light irradiation, but the housing 3 may be fixed while the laser light irradiation part may be moved.

As described above, since the cable side housing 32 is translucent, the irradiated laser light is not absorbed by, but passes through the collared portion 321 of the cable side housing 32. The laser light transmitted through the collared portion 321 of the cable side housing 32 is incident on the base end face of the flanged portion 312 of the circuit substrate side housing 31 being opposite to and in contact with the front end face of the collared portion 321 of the cable side housing 32.

As described above, the circuit substrate side housing 31 is formed in such a manner as to have the property of absorbing the laser light. Therefore, the laser light being incident on the base end face of the flanged portion 312 of the circuit substrate side housing 31 is absorbed by the flanged portion 312 of the circuit substrate side housing 31.

When the flanged portion 312 absorbs the laser light, the flanged portion 312 becomes high in heat. And, the nylon resin forming the flanged portion 312 is melted by the heat. The nylon resin melted by the laser light irradiation is welded to the portion of the front end face of the collared portion 321 being opposite to and in contact with the base end face of the flanged portion 312.

Figure 9:
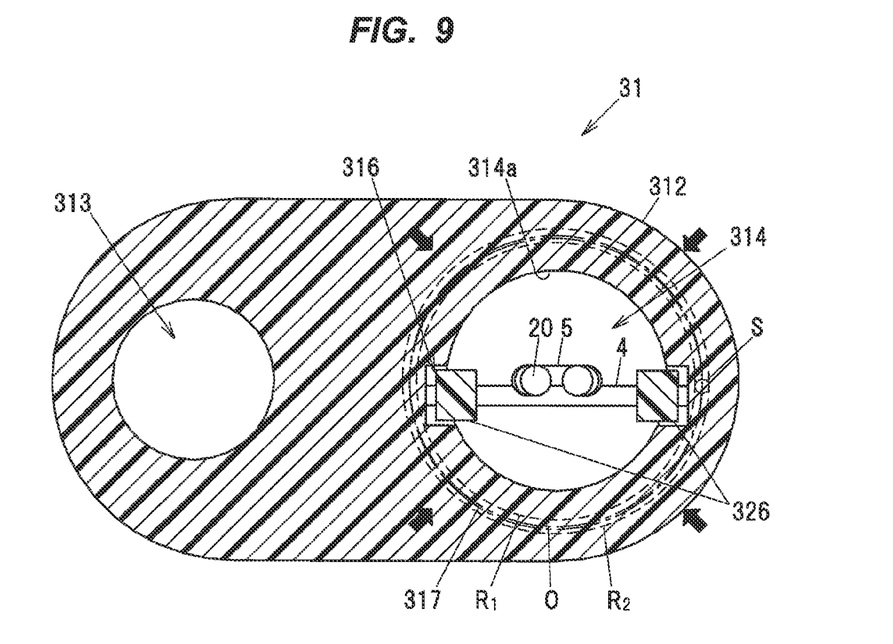
FIG. 9 is a cross-sectional view taken along line D-D in FIG. 1, for schematically describing a welding between the circuit substrate side housing and the cable side housing.

FIG. 9 is a cross-sectional view taken along line D-D of FIG. 1, for schematically describing the welding between the circuit substrate side housing 31 and the cable side housing 32. As shown in FIG. 9, the boundary surface between the flanged portion 312 of the circuit substrate side housing 31 and the collared portion 321 of the cable side housing 32 is formed with a region (herein, also referred to as "the welded portion 317") where the flanged portion 312 and the collared portion 321 are welded together, by the constituent nylon resin of the flanged portion 312 being melted. The welded portion 317 is of a ring shape (e.g., a circular ring shape) having a width (see broken lines "R1" and "R2" in FIG. 9) being in correspondence with a spot diameter of the laser light (see "S" in FIG. 9).

An alternate long and short dash line O in FIG. 9 indicates a trajectory of the laser light. A dotted circle S in FIG. 9 indicates a spot of the laser light. A broken line R1 and a broken line R2 in FIG. 9 are trajectories of an inner end and an outer end, respectively, of the spot of the laser light. That is, the region between the broken line R1 and the broken line R2 indicates the region irradiated with the spot of the laser light.

The region irradiated with the spot of the laser light is substantially coincident with the region of the welded portion 317. In other words, the welded portion 317 is the region where the constituent nylon resin has been melted and welded by the laser light.

As shown in FIG. 9, the welded part 317 is formed at the outer sides relative to the two supporting portions 326 and 326 in the radial directions of the collared portion 321 in the cable side housing 32. The width of the welded portion 317 (the difference between the radii of the two broken lines "R1" and "R2" in FIG. 9) may be set at, for example, on the order of 1 mm. By welding in a ring shape (e.g., a circular ring shape) in the above described manner, it is possible to suppress the occurrence of ingress of a liquid such as water or the like into the interior of the housing 3 from the boundary surface between the flanged portion 312 of the circuit substrate side housing 31 and the collared portion 321 of the cable side housing 32 (see the black arrows in FIG. 9). Note that the front end face of the collared portion 321 of the cable side housing 32 is also being formed with a similar welded portion 317, though not shown.

(Actions and Advantageous Effects of the Embodiment)

According to the present embodiment described above, since the circuit substrate 4 and the IC 5 mounted on the circuit substrate 4 are not directly molded but held in the pre-molded cable side housing 32, it is possible to form the rotational speed sensor 1 without applying a load due to heat or pressure directly to the circuit substrate 4 or the IC 5. Further, since the circuit substrate side housing 31 is laser welded to the cable side housing 32 holding the cable 2 therein, while the cable side housing 32 is welded to the outer surface of the sheath 2a of the cable 2, the housing 3 is capable of being made high in the waterproofing performance. As described above, according to the present embodiment, the rotational speed sensor 1 is capable of being made high in the waterproofing performance with no load due to pressure or heat being applied to the circuit substrate 4 or the IC 5.

Further, in order to ensure the waterproofing performance in the connector type sensors as disclosed in Patent Document 1 and Patent Document 2 described above, at least as a connector to be connected, it is necessary to use a high cost waterproofing connector having a waterproofing function. According to the present embodiment, since the rotational speed sensor 1 is capable of being made high in the waterproofing performance without using such a high cost waterproofing connector, the cost of the rotation speed sensor 1 can be reduced.

SUMMARY OF THE EMBODIMENT

Next, the technical ideas grasped from the above-described embodiments will be described with the aid of the reference characters and the like in the embodiments. It should be noted, however, that each of the reference characters and the like in the following descriptions is not to be construed as limiting the constituent elements in the claims to the members and the like specifically shown in the embodiments.

[1] A rotation speed sensor (1), configured to detect a rotation speed of a rotating body, comprising: a cable (2) composed of an electric wire (20) including a conductor wire (21), and a sheath (2a) provided over the electric wire (20); a circuit substrate (4) mounted with an integrated circuit (5) thereon and connected to the conductor wire (21) being exposed from the cable (2); and a housing (3) including a first housing (31), which is configured to hold the circuit substrate (4) therein, and a second housing (32), which is configured to hold the cable (2) therein, with the first housing (31) being welded to the second housing (32), and with the second housing (32) being welded to a surface of the sheath (2a) of the cable (2).

[2] The rotation speed sensor (1) according to [1] above, wherein the first housing (31) includes a ring shape welded portion (317), which is welded to the second housing (32).

[3] The rotation speed sensor (1) according to [1] or [2] above, wherein the first housing (31) has a property of absorbing a specific wavelength of laser light, while the second housing (32) has a property of transmitting the specific wavelength of the laser light.

[4] The rotation speed sensor (1) according to the above [3], wherein the first housing (31) comprises a resin material impregnated with a dye for dyeing with a predetermined color to absorb the specific wavelength of the laser light.

[5] The rotation speed sensor (1) according to [4] above, wherein the second housing (32) comprises a resin material, which is the same in type as the resin material used in forming the first housing (31).

[6] The rotation speed sensor (1) according to the above [5], wherein the first housing (31) and the second housing (32) both comprise a nylon resin.

[7] The rotation speed sensor (1) according to any one of [1] to [5] above, wherein the conductor wire (21) is electrically connected to the circuit substrate (4) by soldering.

[8] A method for producing a rotation speed sensor (1) configured to detect a rotation speed of a rotating body, comprising: molding a first housing (31) to hold a circuit substrate (4) mounted with an integrated circuit (5) thereon; molding a second housing (32) to hold a cable (2) composed of an electric wire (20) including a conductor wire (21), and a sheath (2a) provided over the electric wire (20), with the second housing (32) being welded to a surface of the sheath (2a) of the cable (2); soldering the circuit substrate (4) to the conductor wire (21) being exposed from the cable (2); holding the circuit substrate (4) in the first housing (31); and welding the first housing (31) and the second housing (32) together with a specific wavelength of laser light.

[9] The rotation speed sensor (1) producing method according to [8] above, wherein the first housing (31) has a property of absorbing the specific wavelength of the laser light, while the second housing (32) has a property of transmitting the specific wavelength of the laser light, so that the step of welding the first housing (31) and the second housing (32) together with a specific wavelength of laser light includes allowing the specific wavelength of the laser light to be transmitted through the second housing (32) and subsequently absorbed by the first housing (31), to thereby melt at least one part of the first housing (31) and weld the at least one part of the first housing (31) to the second housing (32).

(Supplementary Description)

Although the embodiments of the present invention have been described above, the above described embodiments are not to be construed as limiting the inventions according to the claims. Further, it should be noted that not all the combinations of the features described in the embodiments are indispensable to the means for solving the problem of the invention.

Further, the present invention can be appropriately modified and implemented without departing from the spirit thereof. For example, the number of the electric wires constituting the cable 2 is not limited to two, but may be three or more. Further, in the above embodiment, the circuit substrate side housing 31 is configured as the absorption side housing, while the cable side housing 32 is configured as the transmission side housing, but, conversely, the cable side housing 32 may be impregnated with a dye and configured as the absorption side housing, while the circuit substrate side housing 31 may be configured as the transmission side housing. Further, the configuration of the one pair of electric wires 20 and 20 is not limited to the configuration in which the one pair of electric wires 20 and 20 are connected by soldering to the circuit substrate 4, but, for example, the one pair of electric wires 20 and 20 may be connected by welding or the like directly to connection terminals (not shown), respectively, extended out from the IC 5.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A cable with housing, comprising:
   a cable composed of an electric wire including a conductor wire, and a sheath provided over the electric wire;
   an integrated circuit connected to the conductor wire being exposed from the cable; and
   a housing including a first housing, which is configured to hold the integrated circuit therein, and a second housing, which is configured to hold the cable therein, with the first housing being welded to the second housing, and with the second housing being welded to a surface of the sheath of the cable,
   wherein the first housing has a property of absorbing a specific wavelength of laser light, while the second housing has a property of transmitting the specific wavelength of the laser light.

2. The cable with housing according to claim 1, wherein the first housing comprises a resin material impregnated with a dye for dyeing with a predetermined color to absorb the specific wavelength of the laser light.

3. The cable with housing according to claim 2, wherein the second housing comprises a resin material, which is the same in type as the resin material used in forming the first housing.

4. The cable with housing according to claim 3, wherein the first housing and the second housing both comprise a nylon resin.

5. The cable with housing according to claim 1, wherein the first housing includes a ring shape welded portion, which is welded to the second housing.

6. The cable with housing according to claim 1, further comprising: a circuit substrate mounted with the integrated circuit thereon, wherein the conductor wire is electrically connected to the circuit substrate by soldering.

* * * * *